July 2, 1963  J. K. SHANNON  3,095,633
METHOD AND APPARATUS FOR MAKING STORAGE BATTERY PLATES
Filed March 3, 1960  2 Sheets-Sheet 1
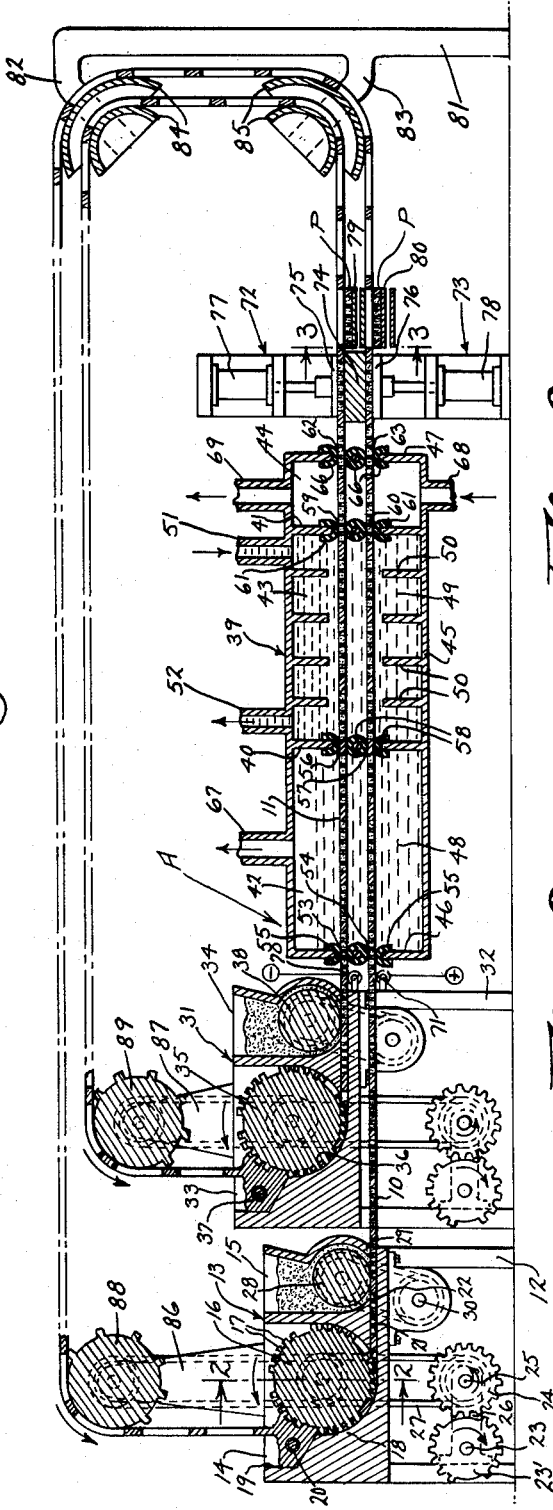
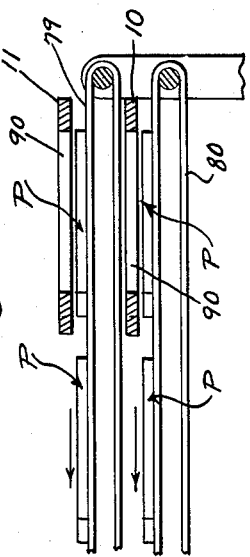
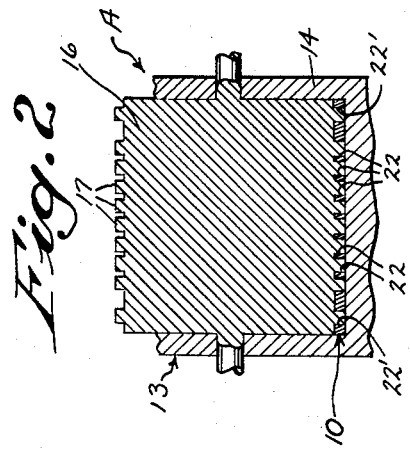
INVENTOR
JOHN K. SHANNON
BY
*Wright & Wright*
ATTORNEYS July 2, 1963     J. K. SHANNON     3,095,633
METHOD AND APPARATUS FOR MAKING STORAGE BATTERY PLATES
Filed March 3, 1960     2 Sheets-Sheet 2

INVENTOR
JOHN K. SHANNON

BY
Wright & Wright
ATTORNEYS

United States Patent Office 3,095,633
Patented July 2, 1963

3,095,633
METHOD AND APPARATUS FOR MAKING STORAGE BATTERY PLATES
John K. Shannon, 2028 63rd Place, Kenosha, Wis.
Filed Mar. 3, 1960, Ser. No. 12,612
4 Claims. (Cl. 29—2)

This invention appertains to storage batteries and more particularly to a novel means and method of making plates of the type embodying an electrical conducting framework for supporting and holding the active material (lead oxide) as commonly used in the conventional lead acid storage battery.

One of the primary objects of my invention is to provide means for making the plates and their grid structures from a continuously formed strip of lead or like electric conducting material; filling the voids of the grid structures with the desired lead oxide paste, and stamping out the plates from the strip leaving a supporting web or border to be returned to the melting pot for the formation of the out going lead strip.

Another salient object of my invention is to provide means for simultaneously forming upper and lower strips with spaced grid structures; filling the voids of the grid structures with the desired lead oxide paste; oppositely charging the paste in the grid structures of the upper and lower strips; rinsing and drying the grid structures; simultaneously stamping plates with the filled grid structures from the strip, and finally, conveying the formed plates, by independent laterally extending conveyors from the remaining webs of the strips.

A further important object of my invention is the provision of means for manufacturing dry charge plates with a minimum of material handling and for reducing the exposure of the active material to the atmosphere and for performing all of the steps of manufacture of the plates step by step during the travel of a formed sheet through the apparatus and not in the atmosphere.

A still further object of my invention is the provision of means for forming feed or sprocket openings in the strip during the formation of the strip, whereby the strip can be effectively fed through the machine by the use of power driven sprocket wheels or the like.

With these and other objects in view, the invention consists in the novel construction, arrangement and formation of parts, as will be hereinafter more specifically described and claimed, and illustrated in the accompanying drawings, in which drawings, FIGURE 1 is a longitudinal sectional view through one form of an apparatus which can be used in my method of making the battery plates, the apparatus being shown diagrammatically;

FIGURE 2 is a transverse sectional view through the apparatus taken on the line 2—2 of FIGURE 1, looking in the direction of the arrows, showing the forming and die roller for the strip and its grid structures;

FIGURE 3 is a transverse sectional view taken on the line 3—3 of FIGURE 1, looking in the direction of the arrows, illustrating the conveyors for carrying the positive and negative plates laterally from the machine and from the webs of the strip;

Referring to the drawings in detail, wherein similar reference characters designate corresponding parts throughout the several views, the letter A generally indicates an apparatus which can be used for the manufacture of the dry charged battery plates P (see FIGURE 6).

Figure 4:
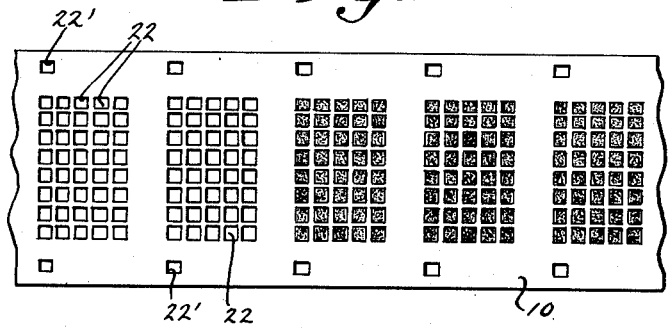
FIGURE 4 is a fragmentary top plan view of the formed strip with its grid structures, certain of the grid structures being shown filled with the desired lead oxide paste.

The apparatus A has been shown in diagrammatic form and it is to be understood that the same can be altered and changed to suit various manufacturing conditions and that the apparatus has only been shown by way of example.

As illustrated, the apparatus A is constructed to form two independent lead or similar strips, namely, a lower strip 10 and an upper strip 11, so that positive and negative plates can be formed simultaneously and whereby the formed plates P can be conveniently stacked as the same come off the machine into groups, with plates of the groups alternated and separated by ordinary insulators. The lower strip 10 can be formed in the following manner: mounted upon a frame 12 is a body 13 divided into a melting pot compartment 14 and a lead oxide pasting compartment 15. Mounted in the pot 14 for rotary movement is a forming and die roller 16. The roller is provided at equidistantly spaced points with groups of die lugs or the like 17, arranged in a pattern to form a grid in the sheet 10, while the sheet is in its semi-molten condition. One compartment wall 18 is shaped to conform to the curvature of the forming and die roller 16 and this wall constitutes a breast against which a portion of the roller bears. Directly above the breast 18 the compartment 14 is enlarged to form the pot, as indicated by the reference character 19, in which the lead or similar material is reduced to a molten state. Any desired type of heating means can be employed for this purpose, but as illustrated, an electric immersion heater 20 is employed. The lower ends of the compartments 14 and 15 are joined by a guide slot or way 21, which is preferably of a width and height corresponding closely to the width and height of the formed strip 10, as will now be set forth. It can be seen however, that the formed strip 10 leaves the bottom of the compartment 14, is fed through the slot 21 and through the bottom of the pasting compartment or chamber 15 and then out of said chamber. As the lead is melted the same flows against the upper end of the roller 16 and during the rotation of the roller the same carries the molten metal against the breast 18 and the roller 16 and breast 18 cooperate to form the strip of a desired width and thickness and the die lugs 17 form in the strip continuously spaced groups of openings 22 which constitute grid structures for the formed plates. The strip, of course, is fed forwardly, as the same cools under the pasting chamber 15 and out of the pasting chamber toward other portions of the apparatus as will also be set forth.

During the forming of the openings 22 in the strip, the roller 16 also forms sprocket openings 22' therein.

In view of the fact that certain stamping operations take place, as will also be later set forth, it is desirable to move the strip 10 forward in a step by step movement, and actually, this step by step movement also provides cooling intervals for the strip. Any desired type of intermittent movement can be provided, but as shown, I provide a power driven shaft 23 having keyed or otherwise secured thereto a gear 23' having spaced groups of teeth and spaces between the teeth. This gear 23' meshes with a spur gear 24 mounted on a rotatable countershaft 25. The shafts 23 and 25 can be carried by a bracket 26 secured to the frame 12. So far, it can be seen that the gear 24 is intermittently driven by the gear 23' and this intermittent movement is transferred to the forming and die roller 16 by any suitable mechanism such as a belt 27 trained about pulley wheels keyed respectively to the shaft 25 and to the hub or bearing shafts of the roller 16. Certain mechanism is driven from the roller, as will also later appear.

Rotatably mounted in the lower part of the pasting compartment 15 is a pasting roller 28, and as the strip 10 passes under the chamber, the roller 28 bears against the strip and forces the paste in the chamber into the voids or openings 22 of the spaced groups of openings of the grid structures. One wall 29 can constitute a scraping or doctor blade which scrapes off excess paste from the strip. This roller is continuously driven at a desired rate of speed from a power driven shaft 30 and this shaft is operatively connected to the roller 28 in any desired way, such as through the medium of a belt and pulleys.

As previously brought out, the lower strip 10 and the upper strip 11 are formed simultaneously and hence, I arrange in advance of the body 13 a duplicate structure just described for forming the strip 11 and filling the voids of the grid structures with the lead oxide. Briefly, the means for forming the strip 11 consists of a body 31 mounted upon a frame 32 and this body 31 includes a chamber 33 and a chamber 34 for the lead oxide paste. Rotatably mounted in the chamber 33 is the forming and die roller 35, which is of the same character as the forming and die roller 16. The roller 35 bears against a forming breast 36 constituting one wall of the chamber and the upper part of the chamber constitutes a pot for molten lead and the lead is reduced to its molten condition and maintained in its molten condition by a heater 37. The strip 11, as it is formed with the spaced grid structures, passes under the compartment 34 and the compartment 34 has mounted therein a pasting roller 38 which fills the voids of the grid structures with the paste. The forming die roller 35 and pasting roller 38 are driven in the same manner as the roller 16 and roller 28. It is to be noted that the rollers 35 and 38 are above the rollers 16 and 28, and hence the strips 10 and 11 are spaced apart.

Arranged in front of the body 31 but in longitudinal alignment with the bodies 13 and 31 is an elongated cylinder or tank 39 and this tank or cylinder is divided by transverse walls 40 and 41 into a series of at least three chambers or compartments indicated respectively by the reference characters 42, 43 and 44. If the elongated tank or shell 39 is of a cylindrical form, then the same includes a cylindrical side wall 45 and circular front and rear end walls 46 and 47. The compartment 42 constitutes a reservoir for the electrolyte 48. The compartment 43 constitutes a reservoir for rinsing water 49. The comparement 44 constitutes a drying chamber as will be more fully pointed out. The rinsing compartment 43 is preferably divided by partitions 50 into separate rinsing spaces and fresh water is continuously supplied to the outermost end of the compartment 49, by means of a fresh water inlet conducting pipe 51. The forward end of the compartment 49 has communicating therewith a pipe 52 for withdrawing the rinsing water from the compartment and it is to be noted that this pipe 52 is located adjacent to the compartment or reservoir 42 for the electrolyte and hence any electrolyte escaping into the water compartment will be drawn off through the pipe 52 and the strips 10 and 11 will advance toward the pipe 51 and will meet progressively clearer rinsing water. As just intimated, the strips 10 and 11 are fed longitudinally through and out of the cylinder, shell or tank 39 and the front wall 46 has formed therein upper and lower entrance slots 53 and 54 for the strips 10 and 11. The walls of these slots are provided with rubber grommets 55 or similar elements for engaging the strips to reduce the leakage of the electrolyte from the compartment 42 to a minimum. The division wall 40 is likewise provided with upper and lower slots 56 and 57 for the passage of the upper and lower strips from the electrolyte compartment into the rinsing compartment and the walls of these slots are provided with rubber grommets 58 or like elements for engaging the opposite faces of the strips to reduce the flow of electrolyte and rinse water from one compartment to the other. The division wall 41 is likewise provided with upper and lower slots 59 and 60 for the passage of the strips therethrough and into the drying compartment 44 and the walls of these slots 59 and 60 are provided with rubber grommets 61 or like elements for engaging the upper and lower faces of the strips to reduce the flow of water from the compartment 43 into the compartment 44 to a minimum. The rear wall 47 is also provided with upper and lower guide and exit slots 62 and 63 to permit the passage of the strips from out of the cylinder or tank 39 and the walls of these slots can be provided with rubber sealing grommets 66, or the like.

The compartment for the electrolyte is provided with a filling and escape pipe 67 for the electrolyte. The drying compartment has communicating therewith a conduit 68 for incoming fresh air and a conduit 69 for outgoing air. The air can be heated and forced through the compartment 44 by suitable blower mechanism.

In actual practice, the strips just prior to their entrance into the tank or shell 39 can be passed through a cooling chamber (not shown) to condition the oxide, but this is not important to the present invention.

It is also preferred to negatively charge the upper strip 11 and to positively charge the lower strip 10. Thus, strip 11 and 10 have connected thereto by rollers, negative and positive leads 70 and 71 and the charging takes place in chamber 42.

From the description so far, it can be seen that the pasted strips 10 and 11 are fed through the shell or tank 39 and the oppositely charged strips are first treated by the electrolyte; second the strips are rinsed and third the strips are then dried. The strips 10 and 11 continue their step by step movement from the tank or shell 39 toward other mechanism, which will now be set forth. As the strips 10 and 11 leave the shell or tank 39 the spaced grid structures are now filled with treated lead oxide paste oppositely charged and the next step in the method is stamping or punching out individual battery plates P from the upper and lower strips. This can be accomplished by providing a stamping or punching machine 72.

The stamping or punching machine 72 embodies a supporting frame 73 having rigidly secured thereto a bed plate or anvil 74 which extends between the strips 10 and 11. Thus, the strip 11 travels over the bed plate or anvil 74. Mounted on the frame 73 above and below the anvil are die or punch plates 75 and 76 and these punch or die plates are of a configuration to agree with the outside shape of the battery plates being made. The punch or die plates 75 and 76 are synchronously operated and movable toward and away from the anvil or bed plate 74 by suitable mechanisms 77 and 78, which can be in the nature of hydraulic or air operated pistons working in cylinders. The operating mechanisms 77 and 78 are timed according to the rate of travel of the strips 10 and 11 and according to the step by step movement thereof. Hence, when the strips 10 and 11 reach the anvil or bed plate 74, portions of the strips carrying the grid structures will be above and below the anvil or bed plate, and at this time the strips will be momentarily held at rest and the mechanisms 77 and 78 will operate to punch out the plates from the strips. As the strips move beyond the bed plate the punched out plates will fall from the strips and will be received on laterally extending upper and lower conveyors 79 and 80. The conveyor 79 extends between the upper and lower strips to receive the plates punched out of the upper strip 11. The conveyor 80 extends under the strip 10 and receives plates punched out therefrom. Thus, the conveyors 79 and 80 carry the punched out plates laterally of the machine. An operator, if so desired, can be stationed at this point so as to see that the punch presses will operate in correct timed relation or to operate the punch presses himself and to see that the plates fall from the strips 10 and 11 onto the conveyors.

This operator can also stack the plates alternately with a separator therebetween so that there will be a positive plate, a separator, a negative plate, a separator and so on.

Figure 5:
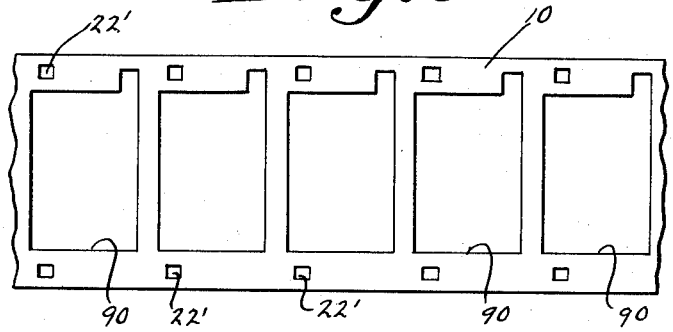
FIGURE 5 is a fragmentary top plan view of the strip after the plates have been cut therefrom.
Figure 6:
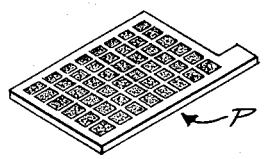
FIGURE 6 is a detail perspective view of one of the complete plates.

As heretofore brought out, one of the important features of the invention resides in the fact that there is no waste of lead and when the plates are punched out from the strips a border or web is left and the border or web constitutes a continuation of the strips. The border or web portions of the strips are then fed back and returned to their melting pots 19 and 33. To effectively bring this about a supporting column 81 is provided at a point beyond the conveyors 79 and 80 and this column carries through the medium of brackets 82 and 83 pairs of guide shoes or the like 84 and 85. These shoes function to guide the remaining webs or border of the strips back over the punch presses and the tank or shell 39 and over the bodies 13 and 31. These bodies 13 and 31 carry respectively bearing brackets 86 and 87 and these brackets in turn rotatably carry sprocket wheels 88 and 89. The teeth of the sprocket wheels engage in sprocket openings formed in the strips 10 and 11 at the time of the molding or punching thereof by the rollers 16 and 35. The sprockets 88 and 89 are power driven in any suitable manner and can be driven from the rollers 16 and 35 and this is preferred, so that the sprocket wheels 88 and 89 will be driven in proper timed relation relative to the rollers 16 and 35, and in a step by step movement. The sprocket wheels 88 and 89 function to pull the remaining web portions of the strips 10 and 11 back toward the front end of the machine and to guide the webs back to the melting pots, as best shown in FIGURE 1. Thus, the webbing is remelted and of course, additional lead is poured into the melting pots from time to time. The strips, with the plates punched out therefrom are best shown in FIGURE 5, and it can be seen that the strip has openings 90 therein corresponding to the shape and size of a battery plate P (see FIGURE 6), punched therefrom. However, it is to be noted that the remaining webbing leaves longitudinal borders and these borders carry the sprocket openings 22' for the sprockets 88 and 89.

Again, it is pointed out that the drawings illustrate one schematic form of an apparatus which can be used in my method of making complete battery plates, but it is to be understood that different forms of the apparatus shown can be utilized in my method.

For instance, the strips can be continuously advanced at the desired rate and the punching dies can be made to move a short distance with the strips and then returned to their starting position for another operation.

What I claim as new is:

1. The method of continuously and simultaneously manufacturing positive and negative battery plates which consists in first making upper and lower superimposed continuous strips from molten metal in a pot with spaced battery plate grid structures in the strips; second, advancing the strips away from the forming means; third, filling the voids of the grid structures of the spaced strips with lead oxide paste; fourth, activating the paste by oppositely charging the strips and passing the strips through a tank containing electrolyte; fifth, rinsing the strips; sixth, drying the strips; and seventh, simultaneously punching out plates from the spaced strips with each plate embodying a pasted grid structure, both of said fourth and fifth steps being performed in a closed chamber and out of the atmosphere.

2. The method of manufacturing positive and negative plates simultaneously as set forth in claim 1, with the additional step of returning the strips after the plates have been punched out therefrom to the melting pots.

3. The method of simultaneously manufacturing positive and negative storage battery plates as defined in claim 1, with the additional steps of carrying the punched out plates laterally and away from the remaining portions of the strips.

4. Means for continuously and simultaneously manufacturing positive and negative plates for storage batteries comprising spaced melting pots, means for maintaining metal in the pots in a molten condition, rotatable forming rollers in said pots acting against certain walls in the pots to provide continuously spaced superimposed strips with equidistantly spaced grid structures in the strips, means for filling the voids in the grid structures of the strips with a lead oxide paste, means including the forming rollers for moving the strips at a same rate of speed in a step by step movement, means for activating the paste in the strips including means for oppositely charging the strips and an elongated cylinder including a reservoir for electrolyte, a reservoir for rinsing water and a drying chamber, the strips being progressively moved through the reservoirs and chamber, and punch presses including an anvil disposed between said strips for punching out plates from the strips with the plates embodying pasted grid structures, the strips being of a greater width than the size of the plates whereby self-sustaining webbing will be left in the strips, and means engaging the remaining webbing and feeding the same back to the pots.

References Cited in the file of this patent

UNITED STATES PATENTS

| | | |
|---|---|---|
| Re. 21,261 | Hazelett et al. | Nov. 14, 1939 |
| 690,917 | Bilot | Jan. 14, 1902 |
| 1,615,237 | Schwartz | Jan. 25, 1927 |
| 1,629,636 | Plews | May 24, 1927 |
| 1,645,424 | Hazelett | Oct. 11, 1927 |
| 1,651,678 | Davis | Dec. 6, 1927 |
| 1,686,122 | Brennan | Oct. 2, 1928 |
| 1,951,932 | Henry et al. | Mar. 20, 1934 |
| 2,680,547 | Donath | June 8, 1954 |
| 2,704,388 | West et al. | Mar. 22, 1955 |

FOREIGN PATENTS

| | | |
|---|---|---|
| 223,631 | Australia | Sept. 3, 1959 |

OTHER REFERENCES

"Physics," by Erich Hausmann and Edgar P. Slack, 3rd ed., D. Van Nostrand Co., Inc., © 1948, pages 411–412.